United States Patent [19]
Caron

[11] Patent Number: 5,048,910
[45] Date of Patent: Sep. 17, 1991

[54] OPTICAL MATRIX SWITCH FOR MULTIPLE INPUT/OUTPUT PORT CONFIGURATIONS

[75] Inventor: Bernard G. Caron, Harrisburg, Pa.

[73] Assignee: AMP Incorporated, Harrisburg, Pa.

[21] Appl. No.: 535,817

[22] Filed: Jun. 11, 1990

Related U.S. Application Data

[63] Continuation-in-part of Ser. No. 520,350, May 8, 1990.

[51] Int. Cl.[5] .............................................. G02B 6/28
[52] U.S. Cl. ........................................ 385/17; 385/24
[58] Field of Search ............... 350/96.13, 96.15, 96.16, 350/96.18, 96.2

[56] References Cited

U.S. PATENT DOCUMENTS

| | | | |
|---|---|---|---|
| 4,787,692 | 11/1988 | Sparke | 350/96.16 |
| 4,822,124 | 4/1989 | Suzuki et al. | 350/96.11 |
| 4,854,660 | 8/1989 | Gutterman et al. | 350/96.18 |
| 4,938,555 | 7/1990 | Savage | 350/96.15 |

FOREIGN PATENT DOCUMENTS

| | | | |
|---|---|---|---|
| 0299604 | 1/1989 | European Pat. Off. | |
| 54-156551 | 12/1979 | Japan | 350/96.15 |
| 56-167106 | 12/1981 | Japan | 350/96.2 |

*Primary Examiner*—John D. Lee
*Assistant Examiner*—John Ngo

[57] ABSTRACT

An optical matrix switch having N number of input ports and M number of output ports is configured according to the following:
 where M is an even number, then the matrix switch is configured of switch elements of N ((M−2)/2) number of 1×3 switch elements plus N number of 1×2 switch elements. Where M is an odd number, then the switch is configured with N ((M−1)/2) number of 1×3 switch elements. Each number of 1/N of the total of such switch elements is arranged longitudinally from a respective input port. Each of the switch elements is connected via a fiber optics transmission line, to the input port or to an adjacent switch element.

11 Claims, 3 Drawing Sheets

OPTICAL MATRIX SWITCH FOR MULTIPLE INPUT/OUTPUT PORT CONFIGURATIONS

FIELD OF THE INVENTION

This application is a continuation in part of co-pending patent application Ser. No. 07/520,350, filed May 8, 1990.

The invention relates to an optical matrix switch and, more particularly, to an optical matrix switch for multiple input/output port configurations.

BACKGROUND OF THE INVENTION

Optical matrix switches are useful in optical communication networks wherein large quantities of data are transmitted through optical fibers at high speed. An output optical signal from one of the input optical fibers, each of which is connected to an optical matrix switch, can be supplied to a selective one of output optical fibers also connected to the switch.

Optical switching provides certain advantages over electronic switching techniques; and, oftentimes, optical matrix switches are utilized in electronic transmission lines by converting an electrical signal to an optical signal, passing the signal through the matrix switch and converting the optical signal back to an electronic signal. The advantages of utilizing an optical matrix switch include greatly increased band width and rapid switch configuration rates.

Spanke, U.S. Pat. No. 4,787,692, teaches optical switch networks and design rules for creating the same. The networks comprise a plurality of input and output stages of optical switch elements. Each input optical switch stage is comprised of a plurality of 1×2 optical switch elements, and each output stage is comprised of a plurality of 2×1 switch elements. The Spanke patent points out that with its invention utilizing such switch network and layout in interconnection, a non-blocking network is achieved having good signal to noise characteristics without crossover and crossthrough limitations as in prior art networks.

Suzuki, U.S. Pat. No. 4,822,124, represents an advancement to the matrix switch of the Spanke patent. As the Suzuki patent points out, with the conventional optical matrix switch, the size thereof is inevitably large in its longitudinal direction. Thus, for example, where the optical switch is provided with four inputs and four outputs to be called a "4×4 Optical Matrix Switch", four rows of optical switch elements must be included. Therefore, the longitudinal length cannot be less than a length as much as four times the longitudinal dimension of the optical switch element. In accord with the Suzuki patent, a stage of 2×2 optical switch elements is provided in place of two intermediate stages of 1×2 and 2×1 switch elements to thereby result in an optical switch smaller in the longitudinal direction.

Both prior art patents utilize switching elements based on a Ti-LiNbO₃ substrate. The interconnection of stages of the input and output sections includes optical crossovers and crossthroughs diffused in the same substrate in which the switch elements are formed. The Suzuki patent indicates that, as a result, the substrate on which the four rows of optical switch elements are provided must be large in surface area, thereby substantially increasing fabric casing costs. With 2×2 group switch means in the center stage of a switching matrix, the total number of switches otherwise required is decreased, and consequently the number of optical crossover and crossthroughs is decreased. Thus, for example, in Spanke, a 4×4 matrix switch would be constructed using a stage 2 consisting of eight 1×2 switches, a stage 1 adjacent to input ports of four 1×2 switches, a stage 3 of eight 2×1 switches, and a stage four of four 2×1 switches, each connected to an associated output port. With Suzuki, the total of sixteen switches in the intermediate stages 2 and 3 would be replaced by a total of four 2×2 switch means, thereby resulting in a matrix switch with a total of twelve switching elements. Again, as with Spanke, the switching elements are Ti-LiNbO₃ substrate based switches.

The present invention takes advantage of advances in the fiber optics switching art. As pointed out above, both the Spanke and Suzuki patents utilize switching elements based on a Ti-LiNbO₃ substrate. As both patents point out, with such switching elements, the longitudinal length of the matrix switch becomes critical. However, advances in the fiber optic switching art make possible the providing of discrete fiber optic switches which may be combined to form matrix switches wherein the longitudinal length is not of the criticality of matrix switches utilizing the substrate switches of the prior art. Further, Application Ser. No. 07/520,350 teaches utilizing discrete fiber optic switches in matrix switches having switching elements arranged in a longitudinal configuration from input ports to output ports. Matrix switches of such configuration are improved in that connection between an input port and an output port may be made with an activation of a minimum number of switching elements. This not only decreases power requirements for the activation of matrix switches—which requirements may be substantial with switches having large numbers of input ports and output ports, for example, on the order of 64 input ports and 64 output ports—but further is advantageous in that, permitted, is a simplified and easier power switching arrangement for the connection of the optical matrix switch grid to the power controller.

Prior art matrix switches based on Ti-LiNbO₃ substrate switching elements are further limited by the requirement that input ports and output ports be restricted to an even number of ports. Thus switches wherein the number of input ports is defined as N, and the number of output ports is defined as M, are characteristically limited to being non zero powers of 2. With the present invention, it has been found that discrete fiber optic switch elements may be provided having a 1×3 or 3×1 configuration thereby permitting matrix switches of an uneven number of input ports and/or an uneven number of output ports, and, in fact, any number of input ports and any number of output ports.

Switching elements useful in the matrix switches of the present invention are modifications of those taught by Gutterman, et al., U.S. Pat. No. 4,854,660, and Kokoshvill, U.S. Pending Application Serial Number 053,220, entitled "Fiber Optic Bypass Switch", filed on May 13, 1987, having European priority EP 0 299 604 A1. The switch elements of the matrix switches of the present invention include an imaging system having a symmetry such as a spherical reflector. The switch also includes a group of optical fiber end faces including at least a first optical fiber end face via which light is transmitted to the imaging system and at least a second end face which transmits light away from the imaging system. A displacing mechanism is provided for displacing the imaging system and the fiber end face group relative to one another between two positions. With a 1×2 switch element in a first position, the first and second fiber end faces are conjugate with respect to the symmetry of the imaging system so that light from the first fiber is imaged by the imaging system into the second fiber. In a second position, the first and third fiber end faces are conjugate with respect to the symmetry of the imaging system so that light from the first fiber is imaged by the imaging system into the third fiber. Thus, it is possible to switch the light from the first fiber into the second fiber or into the third fiber depending on the position of the displacing mechanism.

With a 2×1 switch element the first group includes two fiber end faces and the second group includes a single fiber end face designated third fiber end face. In the first position, the first and third fiber end faces are conjugate with respect to the symmetry of the imaging system so that light from the first fiber is imaged by the imaging system into the third fiber. In the second position, the second and third fiber end faces are conjugate with respect to the symmetry of the imaging systems so that light from the second fiber is imaged by the imaging system into the third fiber. Thus, it is possible to switch the light from either the first fiber or from the second fiber into the third fiber depending upon the position of the displacing mechanism.

Further, with modification of the switching elements taught by Gutterman, et al., U.S. Pat. No. 4,854,660 and Kokoshvill, Priority Number EP 0 299 604 A1, the displacing mechanism may displace both the imaging system and the fiber end groups relative to one another between four position whereby in a first stage, the imaging system is stationery and the fiber end face groups are switched between two positions and a second stage in which the fiber end face groups are stationery and the imaging system is displaced relative to the fiber end groups. Four relative positions may be provided making possible the providing of a 1×4 switch wherein in a first position, first and second fiber end faces are conjugate with respect to the symmetry of the imaging system so that light from the first fiber is imaged by the imaging system into the second fiber; in a second position, first and third fiber end faces are conjugate with respect to the symmetry of the imaging system, so that light from the first fiber is imaged by the imaging system into the third fiber; in a third position, the first and a fourth fiber end face are conjugate with respect to the symmetry of the imaging system so that light from the first fiber is imaged by the imaging system into the fourth fiber, and in a fourth position, the first and fifth fiber end faces are conjugate with respect to the symmetry of the imaging system so that light from the first fiber is imaged by the imaging system into the fifth fiber.

Interestingly, however, is that the fourth position may be avoided thereby eliminating a position whereby light from the first fiber would be imaged by the imaging system into the fifth fiber. And, further, the fifth fiber itself may be eliminated, thereby resulting in a switch with one input and three outputs. In this configuration, the switch includes a group of optical fiber end faces including at least a first optical fiber end face via which light is transmitted to the imaging system and at least second, third and fourth fiber end faces which transmits light away from the imaging system. The displacing mechanism not only displaces the imaging system relative to the fiber end face groups relative to one another but also may displace the fiber end face groups relative to the imaging system. In this instance, the mechanism may include two means, one for displacing the imaging system and a second for displacing the fiber groups. With the 1×3 switch element of the present invention in a first position, the first and second fiber end faces are conjugate with respect to the symmetry of the imaging system so that light from the first fiber is imaged by the imaging system into the second fiber. In a second position, the first and third fiber end faces are conjugate with respect to the symmetry of the imaging system so that light from the first fiber is imaged by the imaging system into the third fiber. In a third position, the first and fourth fiber end faces are conjugate with respect to the symmetry of the imaging system so that light from the first fiber is imaged by the imaging system into the fourth fiber. Thus, it is possible to switch light from the first fiber into the second fiber or into the third fiber or into the fourth fiber depending upon the position of the displacing mechanism. Thus, it is possible to switch the light from the first fiber into either the second fiber, the third fiber or the fourth fiber depending upon the position of the displacing mechanism.

SUMMARY OF THE INVENTION

The present invention relates to an optical matrix switch having N number of input ports and M number of output ports where N and M each is an integer. Where N is equal to or less than M and M is an even integer, then the optical matrix switch of the present invention has a configuration of switch elements of N ((M−2)/2) number of 1×3 switch elements plus N number of 1×2 switch elements. Where N is equal to or less than M and M is an odd number of output ports, then the configuration of switch elements is N ((M−1)/2) number of 1×3 switch elements. Each of the number 1/N of the total of such switch elements is arranged longitudinally therefrom a respective input port with each of the switch elements connected via a fiber optics transmission line to the input port or to a adjacent switch element.

In the instance where M is equal to or less than N, the optical matrix switch may be configured with 3×1 and 2×1 switch elements. In such case and where N is even, then the configuration of switch elements is M ((N−2)/2) number of 3×1 switch elements plus N number of 2×1 switch elements. In the instance where N is odd then the configuration of switch is M ((N−1)/2) number of 3×switch elements. Each member 1/M of the total of such switch element is arranged longitudinally therefrom a respective output port with each of said switch elements connected via a fiber optic transmission line to the output port or to an adjacent switch element.

Each 1×3 fiber optics switch element comprises an imaging system having symmetry and a group of optical fiber end faces including a first optical fiber end face via which light is transmitted to the imaging system and second, third, and fourth optical fiber end faces via which light is transmitted away from the imaging system. Additionally is provided means for displacing the imaging system and for displacing the group of fiber end faces relative to one another to a first, second, or third position.

Similarly the 1×2 fiber optics switch element may comprise an imaging system having a symmetry and a group of optical fiber end faces including a first optical end face via which light is transmitted to the imaging system and second and third optical fiber end faces via which light is transmitted away from the imaging system. Further provided is means for displacing a group of fiber end faces relative to one another between a first position and second position. Further with this optical switch element, in the first position, light from the first fiber end face is imaged into the second fiber end face, and in the second position, light from the first fiber end face is imaged into the third fiber end face.

With configurations utilizing $3\times 1$ fiber optic switch elements, the preferred fiber optic switch element comprises an imaging system having a symmetry and a group of optical fiber end faces including a first, second, and third optical fiber end face via which light may be transmitted to the imaging system and a fourth optical fiber end face via which light may be transmitted away from the imaging system. In this embodiment, the optical switch element further includes means for displacing the group of fiber end faces relative to one another to a first, second, and third position where, in the first position light from the first fiber end face is imaged into the fourth fiber end face; in the second position, light from the second fiber end face is imaged into the fourth fiber end face; and in the third position, light from the third fiber end face is imaged into the fourth fiber end face. In this embodiment wherein $2\times 1$ switch elements are utilized, the preferred switch element again comprises an imaging systems having symmetry and a group of optical fiber end faces including a first and second fiber end face via which light may be transmitted to the imaging system and a third optical fiber end face via which light may be transmitted away from the imaging system. With this switch element, included is means for displacing the group of fiber end faces relative to one another between first and second positions. In the first position, light from the first fiber end face is imaged into the third fiber end face. In the second position, light from the second fiber end face is imaged into the third fiber end face.

In the instance where N is equal to or less than M, the optical matrix switch preferably is configured in accord with the first embodiment; that is, with $1\times 3$ switch elements and $1\times 2$ switch elements. In the instance where M is less than N, the preferred configuration is of $3\times 1$ switch elements and $2\times 1$ switch elements in accord with the second embodiment described above.

DESCRIPTION OF A PREFERRED EMBODIMENT

Figure 1:
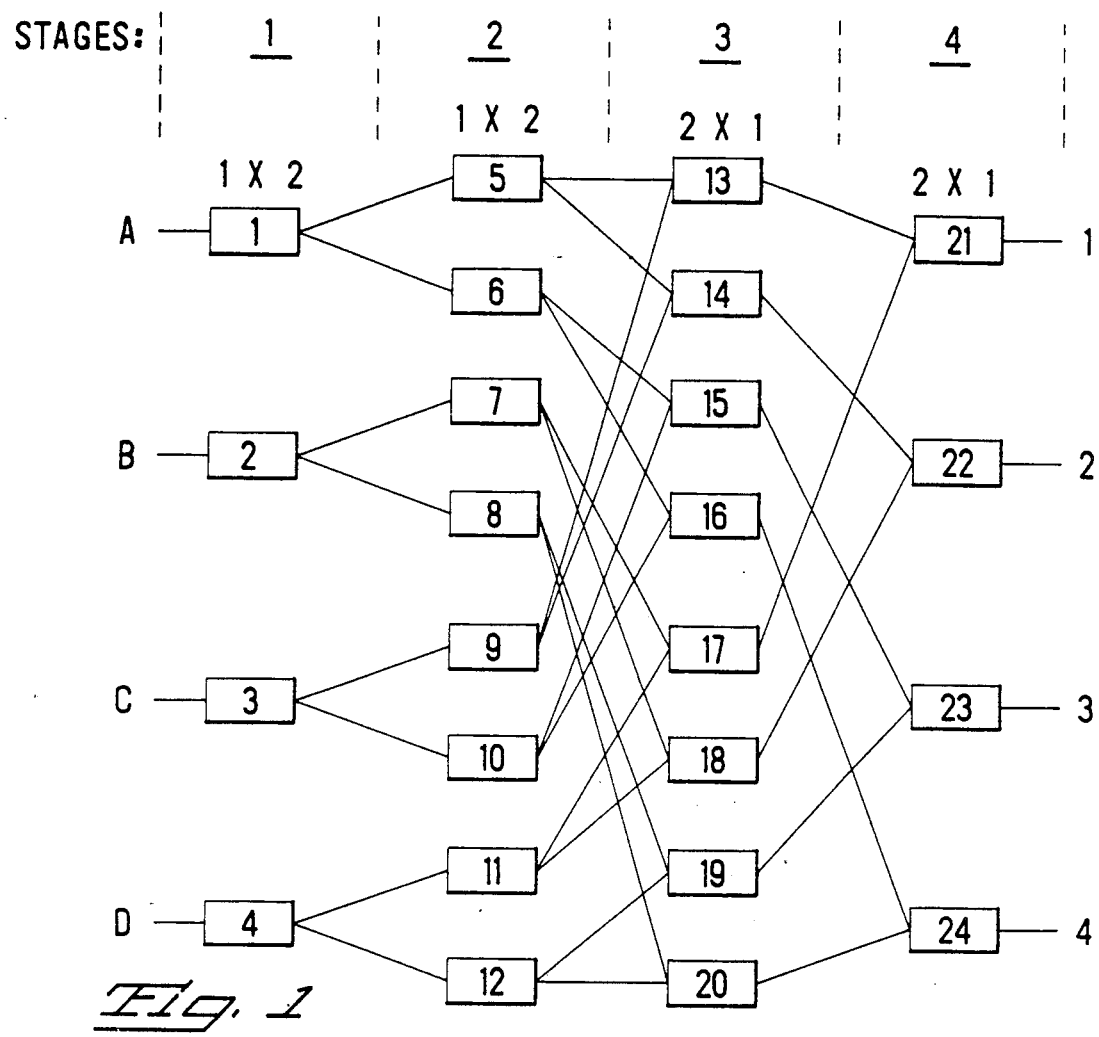
FIG. 1 is a schematic diagram of a $4\times 4$ optical matrix switch according to Spanke, U.S. Pat. No. 4,787,692.

FIG. 1 is a schematic diagram of a $4\times 4$ optical matrix switch according to a configuration as defined by the Spanke patent. The optical matrix switch has four input ports M labeled A, B, C, and D and four output ports N labeled 1, 2, 3, and 4. Switching stages, which are the longitudinal number of switches between the input and output ports, are defined as equal to $\log_2 4 + \log_2 4$ or to $2+2$. Each stage is assigned a number from 1 to 4 in sequence from the input ports to the output ports. Shown in FIG. 1 are such numbered stages. Further, the stage numbered $\log_2 M$ which is the stage numbered 2, comprises the number $4\times 4/2$ of optical $1\times 2$ switch elements or, in other words, a total of eight switch elements (shown numbered 5 through 12 in stage 2). Each stage between the stage of $\log_2 M$ (stage of $\log_2 4 =$ stage 2) and the input ports consists of one-half of the number of switch elements in the next nearer stage to the stage $\log_2 M$ (stage 2). Hence, stage 1 consists of four $1\times 2$ optical switches labeled 1 through 4. Further, the stage numbered $\log_2 M + 1$ (stage numbered 3) consists of $M\times N/2$ ($4\times 4/2 =$ eight) optical $2\times 1$ switch elements labeled 13 through 20. As shown, stage 3 has eight $2\times 1$ switch elements numbered from 1 to 8. Each stage between the stage $\log_2 M + 1$ (stage 3) and the output ports comprises one-half of the number of $2\times 1$ optical switches. Hence, stage 4 would comprise four of the $2\times 1$ optical switches labeled 21 through 24, again as shown in FIG. 1.

Figure 2:
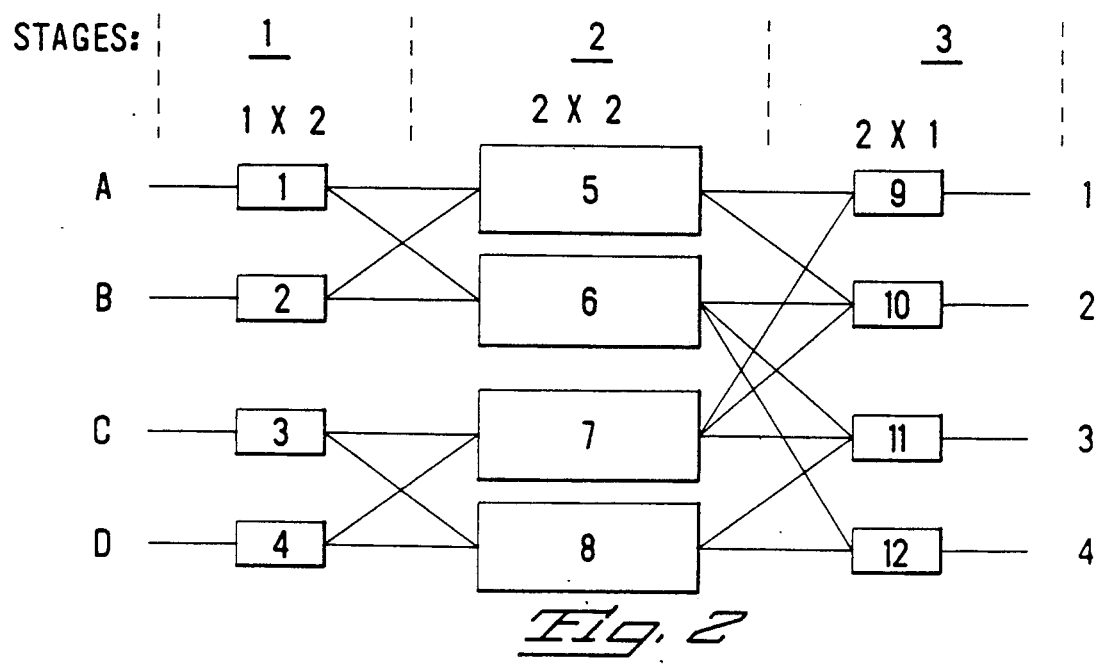
FIG. 2 is a schematic diagram of a $4\times 4$ optical matrix switch according to Suzuki, U.S. Pat. No. 4,822,124.

With reference to FIG. 2, Suzuki teaches replacing the $1\times 2$ and $2\times 1$ switches of stage 2 and stage 3 with four $2\times 2$ switches numbered 5, 6, 7, and 8, as in FIG. 2. As shown in a $4\times 4$ configuration, the total switches would be 12 and the number of crossovers and crossthroughs is reduced.

Figure 3:
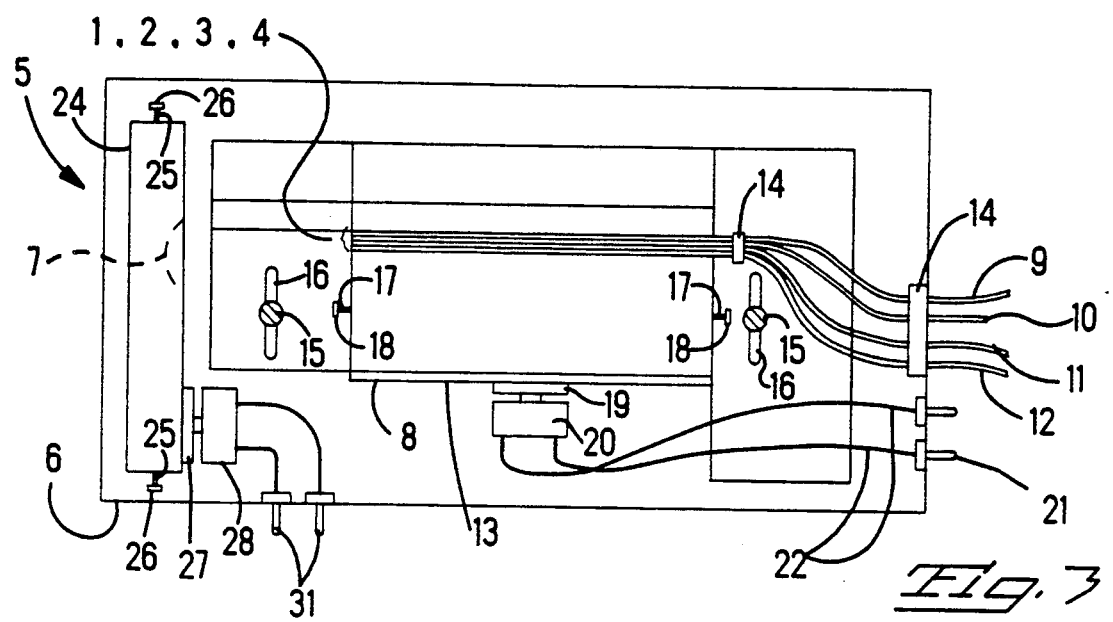
FIG. 3 illustrates one of the switch elements useable in the present invention.

FIG. 3 schematically illustrates an embodiment of a switch useful in the present invention shown as a $1\times 3$ switch 5 comprising a base 6. Fixedly mounted on the base 6 is a spherical reflector 7. The switch 5 also includes a subassembly 8. The ends 1, 2, 3, and 4 of a group of optical fibers 9, eight, 11, and 12 are mounted on a movable substrate 13 which forms part of the subassembly 8. The end faces 1, 2, 3, and 4 of the fibers 9, 8, 11, and 12 are oriented towards the spherical reflector 7 and are arranged with respect to the center of curvature of the spherical reflector 7 so that the spherical reflector 7 provides optical paths between certain fiber pairs. More particularly, the end faces 1, 2, 3, and 4 are arranged in a group of three and one. The fibers are maintained in position by the support structures 14.

The end faces of the fibers may be polished or cleaved. Polished end faces are provided by a polishing operation to all the fiber ends after the fiber ends have been positioned on the substrate 13. The advantage of cleaved end faces is that the fibers may be assembled in precisely defined positions on the substrate 13.

Screws 15 are mounted in slots 16 and are used for initial alignment of the subassembly 8 with respect to the reflector 7. More particularly, when the screws 15 are loosened, the slots 16 serve as guides for the subassembly 8. Once initial alignment is achieved, i.e. once the subassembly is positioned for a first switching state, the screws 15 are tightened.

Substrate 13 is pivotably mounted via axis 17 to pivot points 18. To move the switch from a first switching state to a second switching state (i.e. a state in which optical paths are provided between different pairs of fibers than in the first switching state), a solenoid 19 and magnet 20 are used to linearly translate the pivotable substrate 13. The permanent magnet 20 is mounted to the substrate 13 and with activation the substrate 13 is canted from a first position to a second position. Illustratively, in the first switching state the solenoid 19 is off. When the solenoid 19 is activated by way of connector 21 and lead 22 the magnet 16 is repelled and the subassembly 7 is pivoted into a second position so that the second switching state is realized.

Similarly reflector 7 mounted as part of reflector substrate 23 is pivotable via axis 24 through pivot points 26 Solenoid 26 and magnet 28 are provided in conjunction with the pivotable reflector substrate 24 and are activated via electrical leads 29 through connectors 28. Reflector substrate 23, and consequently, reflector 7 may be moved from a first switching state to a second switching state (i.e. a state in which optical paths are provided through different pairs of fibers then those in the first switching state) via the solenoid 26 and magnet 27 to linearly translate the reflector substrate 23. Illustratively, in the first switching state, the solenoid 26 is off. When the solenoid 26 is activated, the magnet 27 is repelled and the reflector substrate 23 is pivoted into a second position so that the second switching state is realized.

In an exemplary operation, with reflector 7 in a first position and end faces 1, 2, 3, and 4 in a first position, light from the first fiber end face 1 is imaged into second fiber end face 2. With reflector 7 in a second position and fibers 9, 10, 11, and 12 in the first position, light from the first fiber end face 1 is imaged into the third fiber end face 3. With reflector 7 in the second position and fibers 9, 10, 11, and 12 in a second position, light from the first fiber end face one is imaged into the fourth fiber end face 4. Hence, provided is a switch capable of directing light imaging from a first fiber end face into any of three fiber end faces, thereby providing the capability of a 1×3 switch.

Figure 4:
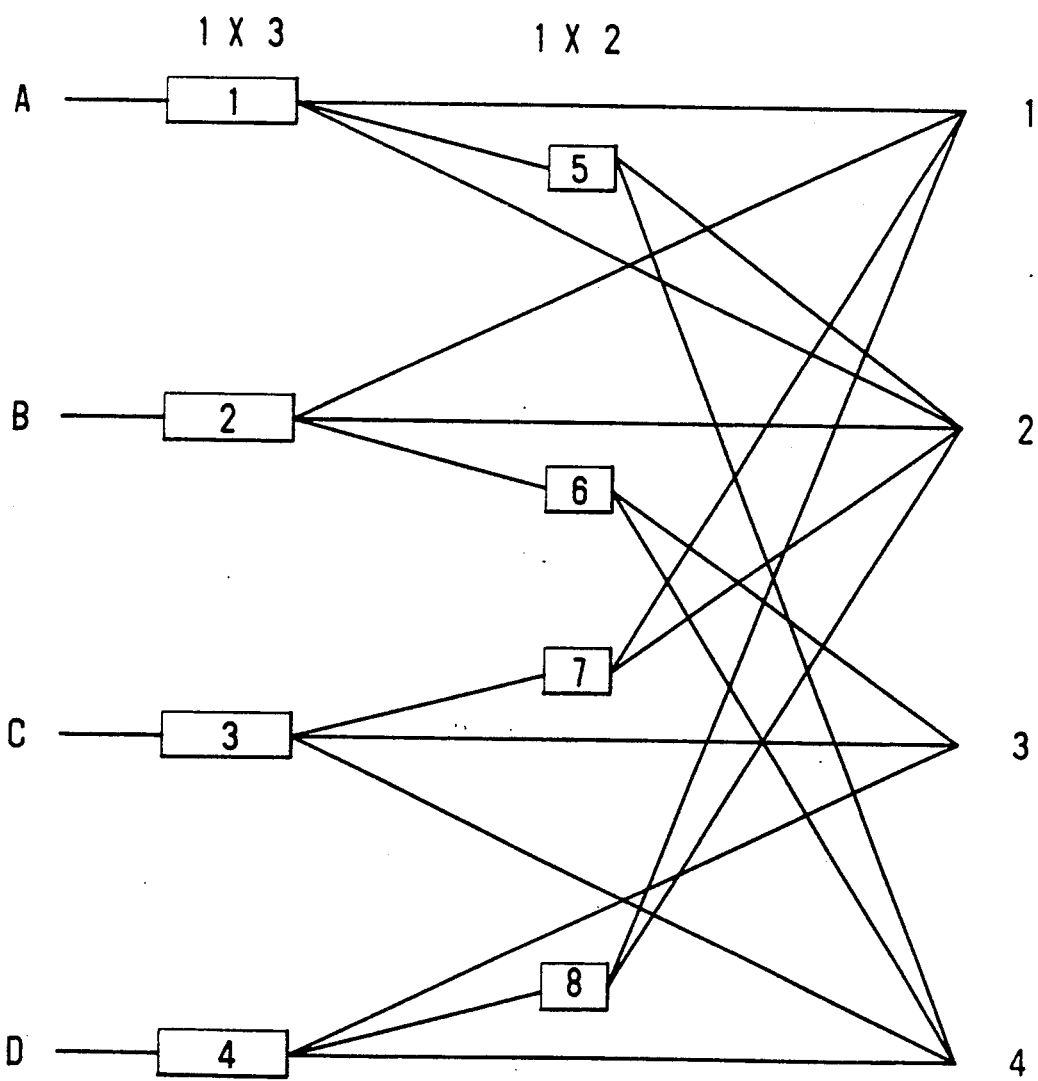
FIG. 4 is a schematic diagram of a $4\times 4$ optical matrix switch according to the present invention.

FIG. 4 is a schematic diagram of a 4×4 optical matrix switch according to the present invention. The matrix switch is shown as configured with four 1×3 switches and four 1×2 switch elements. In accordance with the present invention, then, a total of 8 switch elements are required to provide communication from 4 input ports to A, B, C, and D, to 4 output boards, 1, 2, 3, and 4. This optical matrix switch has been configured in accord with the present invention. In the switch shown, N is less or equal to M; that is, the number of N 4 input ports is less than or equal to the number of 4 output ports. Further N, the number 4, is even. Hence the configuration of the switch elements should be M ((N−2)/2 1×3 switches plus M 1×2 switch elements. Hence the number of 1×3 switches is 4 ((4−2) /2) which is 4 1×3 switches.

Figure 5A:
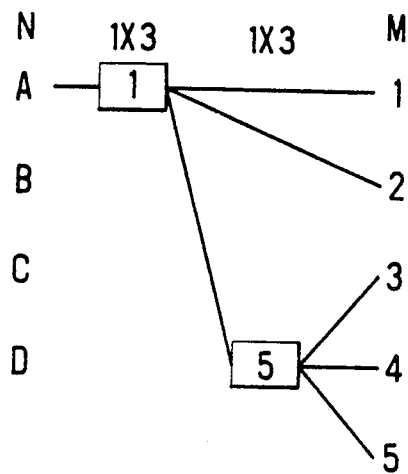
FIG. 5A through 5D are schematic diagrams of the banks of a $4\times 5$ optical matrix switch according to the present invention.
Figure 5B:
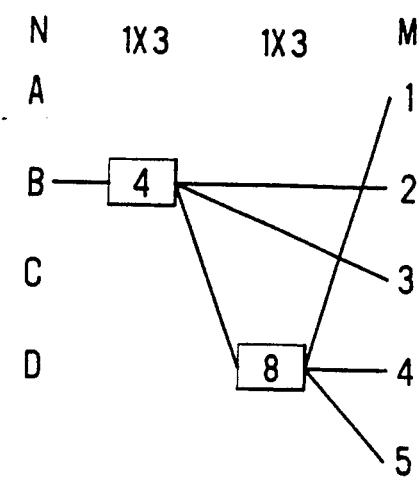
Figure 5C:
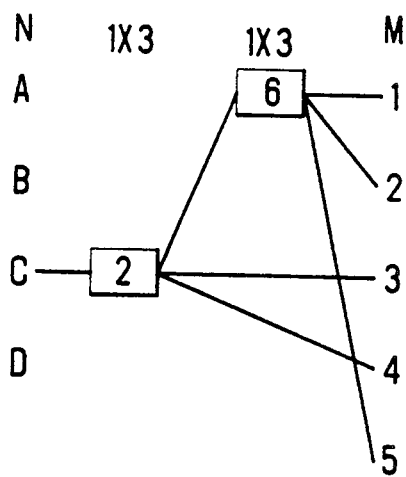
Figure 5D:
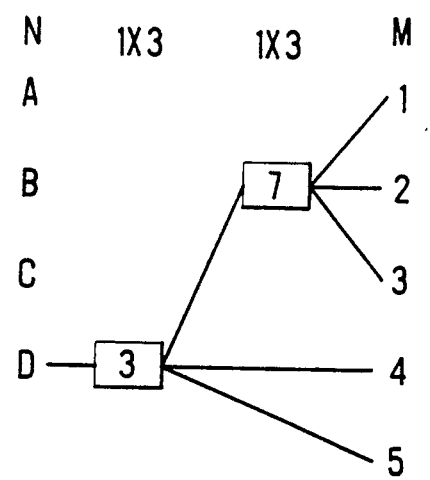

FIGS. 5A through 5D are schematic representations of banks of a 4×5 optical switch according to the present invention. By banks is meant an input port and all associated switches and output ports as shown separate in each figure. FIG. 5A shows, input port with associated 1×3 switch elements numbered 1 and 5. FIG. 5B shows the input port B with associated 1×3 switch elements numbered 4 and 8. FIG. 5C shows input port C with associated 1×3 switch elements number 3 and 6 and FIG. 5D shows input port D with associated switch elements numbered 3 and 7. The Figures show output port 1 with associated switch elements 1, 8, 4, 6, 2, 7, and 3; output port 2 with switch elements 1, 4, 6, 2, 7, and 3; output port 3 with switch elements 5, 1, 4, 2, 7, and 3; output port 4 with switch elements 5, 1, 8, 4, 2, and 3 and output port 5 with switch elements 5, 1, 8, 4, 6, 2, and 3. The matrix switch shown in FIG. 5A through 5D has been configured in accordance with the present invention, where N is the number of input ports and M is the number of output ports. Since the number of output ports M is an odd number then the switch elements are configured in accord with the relationship N ((M−1)/2) number of 1×3 switch elements or in other words 4 ((5−1)/2) number of 1×3 switch elements. Hence the configuration of switch elements works out to 10 number of 1×3 switch elements.

In the example shown and in accord with the second embodiment of the present invention, the matrix switch may be configured with 3×1 and in the appropriate case, 2×1 switch elements. In such instance and accord with the present invention, hence N is equal to 4 an even number in configuration is M ((N minus 2)/two) number of 3×1 switch elements; hence the number of 3×1 switch elements would be equal to 5 ((4−2)/two) or a total of 10 3×1 switch elements.

Optical matrix switches having N input ports and M output ports, where N and M each as an integer are configured according to the following relationships. Where M is even then the matrix switch is configured of switch elements of N ((M−2)/2) number of 1×3 switch elements and N number of 1×2 switch elements. Where M is an odd integer then the matrix switch is configured of switch elements of N ((M−1)/2) number of 1×3 switch elements. Further, where N is a even number the optical matrix switch may be configured of switch elements of M ((N−2)/2) number of 3×1 switch elements plus M number of 2×1 switch elements, and in the case where N is an odd number then the matrix switch is of a configuration of switch elements of M ((N−1)/2) number of 3×1 switch elements.

While what has been described with reference to FIGS. 4 and 5A through 5D constitutes a presently preferred embodiment of the invention, it should be recognized that the optical matrix switch may take other forms so long as it consists of a configuration of switch elements in accord with the relationships defined above and in the claims. For example, encompassed within the present invention are switch elements of a 1×3, 1×2, 3×1, or 2×1 configuration which do not depend upon the imaging system of the switching elements of Gutterman, et al., U.S. Pat. No. 4,864,660, or Kokoshvill, U.S. Pending Application Ser. No. 053,220, entitled "Fiber Optic Bypass Switch". Accordingly, is should be understood that the invention is to be limited only insofar are required by the scope of the following claims.

What is claimed is:

1. An optical matrix switch having N number of input ports and M number of output ports, comprising:
    where M is an even number, then a configuration of switch elements of N ((M−2)/2) number of 1×3 switch elements plus N number of 1×2 switch elements; and
    where M is an odd number, then a configuration of switch elements of N ((M−1)/2) number of 1×3 switch elements;
    each said input port communicating with each said output port;
    said switch elements being arranged such that each output port is connected, via a fiber optics transmission line, to N number of said switch elements, and each said switch element is connected longitudinally to one of said input ports or to an intervening switch element.

2. An optical matrix switch having N number of input ports and M number of output ports, comprising:
    where N is equal to or less than M and M is an even number then a configuration of switch elements of N ((M−2)/2) number of 1×3 switch elements plus N number of 1×2 switch elements; and where N is equal to or less than M an dM is an odd number, then a configuration of switch elements of N ((M−1)/2) number of 1×3 switch elements;

each said input port communicating with each said output port; and said switch elements being arranged such that each output port is connected, via a fiber optics transmission line, to N number of said switch elements, and each said switch element is connected longitudinally to one of said input ports or to an intervening switch element;

where M is equal to or less than N and N is an even number then a configuration of switch elements of M ((N−2)/2) number of 3×1 switch elements plus M number of 2×1 switch elements;

where M is equal to or less than N and N is odd, then a configuration of switch elements of M ((N−1)/2) number of 3×1 switch elements;

each said input port communicating with each said output port; and said switch elements being arranged such that each input port is connected, via a fiber optics transmission line, to M number of said switch elements, and each said switch element is connected longitudinally to one of said output ports or to an intervening switch element.

3. The optical matrix switch of claim 1 or claim 2 having N input ports and N output ports comprising, where N is an even integer, $(N^2−2N)/2$ number of 1×3 switch elements plus N number of 1×2 switch elements and where N is an odd integer $(N^2−N)/2$ number of 1×3 switch elements.

4. The optical matrix switch of claim 1 or claim 2 having 4 input ports and 4 output ports and a configuration of switch elements of 4 number of 1×3 switch elements and 4 number of 1×2 switch elements.

5. The optical matrix switch of claim 1 or claim 2 wherein each 1×3 fiber optic switch element comprises:

an imaging system having a symmetry;

a group of optical fiber end faces including a first optical fiber end face via which light is transmitted to said imaging system and second, third, and fourth optical fiber end faces via which light is transmitted away from said imaging system;

means for displacing the imaging system and for displacing the group of fiber end faces relative to one another to a first position, a second position, or a third position;

in said first position, light from said first fiber end face is imaged into said second fiber end face;

in said second position, light from said first fiber end face is imaged into said third fiber end face; and in said third position, light from said first fiber end face is imaged into said fourth fiber end face.

6. The 1×3 fiber optic switch element of claim 5 wherein said imaging system is pivotally mounted and said group of optical fiber end faces is pivotally mounted and said means for displacing the imaging system comprises a solenoid for tipping the imaging system along said pivot between a first position and a second position; and, wherein said means for displacing a group of fiber end faces relative to one another is a solenoid which, when activated, causes the group of fiber end faces to tip through said pivot from a first position to a second position.

7. The optical matrix switch of claim 1 or claim 2 wherein each 1×2 fiber optic switch element comprises:

an imaging system having a symmetry:

a group of optical fiber end faces including a first optical end face via which light is transmitted to said imaging system and a second and third fiber end face via which light is transmitted away from said imaging system;

means for displacing a group of fiber end faces relative to one another between a first position and a second position;

in said first position, light from said first fiber end face is imaged into said second fiber end face; and in said second position, light from said first fiber and face is imaged into said third fiber end face.

8. The 1×2 fiber optic switch of claim 7 wherein said imaging system is pivotally mounted, said group of optical fiber end faces is pivotally mounted, said means for displacing he imaging system comprises a solenoid for tipping the imaging system along said pivot between a first position and a second position, and said means for displacing a group of fiber end faces relative to one another comprises a solenoid which, when activated, causes the group of fiber end faces to tip through said pivot from a first position to a second position.

9. The optical matrix switch of claim 2 wherein each 3×1 fiber optic switch element comprises;

an imaging system having its symmetry;

a group of optical fiber end faces including first, second, and third optical fiber end faces via which light is transmitted to said imaging system and a fourth optical end face via which light is transmitted away from said imaging system; means for displacing the imaging system and for displacing the group of fiber end faces relative to one another between a first position, a second position, and a third position;

in said first position, light from said first fiber end face is imaged into said fourth fiber end face; in said second position, light from said second fiber end face is imaged into said fourth fiber end face; and in said third position, light from said third fiber end face is imaged into said fourth fiber end face;

and further, wherein each 2×1 fiber optic switch element comprises:

an imaging system having a symmetry;

a group of optical fiber end faces including a first and second optical fiber end face via which light is transmitted to said imaging system and a third optical fiber end face via which light is transmitted away from said imaging system;

means for displacing the group of fiber optic end faces relative to one another between a first position and a second position;

in said first position, light from said first optic fiber end face is imaged into said third fiber end face; and in said second position, light from said second optic fiber end face is imaged into said third fiber end face.

10. The 3×1 and 2×1 fiber optic switches of claim 9 wherein said imaging system is pivotally mounted, said group of optical fiber end faces is pivotaly mounted, said means for displacing the imaging system comprises a solenoid for tipping the imaging system along said pivot between a first position and a second position, and said means for displacing a group of fiber end faces relative to one another comprises a solenoid which, when activated, causes the group of fiber end faces to tip through said pivot from a first position to an second position.

11. The optical matrix switch of claim 2 having M number of input ports and M number of output ports comprising, where M is an even integer, $(M^2-2M)/2$ number of $3\times 1$ elements plus M number of $2\times 1$ switch elements, and where m is an odd integer, $(M^2-M)/2$ number of $3\times 1$ switch elements.

* * * * *